(12) United States Patent
Haka et al.

(10) Patent No.: US 7,478,709 B2
(45) Date of Patent: Jan. 20, 2009

(54) VIBRATION DAMPING APPARATUS

(75) Inventors: Raymond J. Haka, Brighton, MI (US);
James A. Springer, Ann Arbor, MI (US); Robert S. Samanich, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 110 days.

(21) Appl. No.: 11/034,023

(22) Filed: Jan. 11, 2005

(65) Prior Publication Data

US 2006/0151273 A1     Jul. 13, 2006

(51) Int. Cl.
*F16F 7/10* (2006.01)
(52) U.S. Cl. .................................. 188/378; 74/573.12
(58) Field of Classification Search .................. 188/378, 188/379; 74/573.1, 573.12, 574.4; 464/180; 192/301
See application file for complete search history.

(56) References Cited

U.S. PATENT DOCUMENTS

| 1,813,820 | A |   | 7/1931 | Ross |
| 2,267,311 | A |   | 12/1941 | Smith |
| 5,308,289 | A | * | 5/1994 | Funahashi ..................... 474/94 |
| 5,749,269 | A | * | 5/1998 | Szymanski et al. ........ 74/573.12 |
| 5,829,319 | A | * | 11/1998 | Mokeddem ................. 74/574.1 |
| 2005/0183922 | A1 | * | 8/2005 | Springer et al. ........... 192/70.12 |

FOREIGN PATENT DOCUMENTS

| GB | 2 388 849 | * | 11/2003 |
| JP | 9-166181 | * | 6/1997 |

* cited by examiner

*Primary Examiner*—Bradley T King

(57) ABSTRACT

A vibration damper apparatus has two substantially freely rotatable inertia members disposed within a rotatable hub. Each of the members has a wide semi-cylindrical portion and a narrow semi-cylindrical portion with the wide portion of the first damper member being axially aligned with the narrow portion of the other damper member.

11 Claims, 2 Drawing Sheets

VIBRATION DAMPING APPARATUS

TECHNICAL FIELD

This invention relates to vibration dampers and, more particularly, to rotating-type vibration dampers.

BACKGROUND OF THE INVENTION

Rotating components, such as hubs, generally require some type of either balancing or vibration damping to reduce noise during their operation. Hubs are generally rotated at very high speeds, particularly hubs found within transmission apparatus. These mechanisms can produce noise due to the vibrations. The noise, while not detrimental, is objectionable and therefore it is desirable to prevent the vibration from occurring.

Generally, a vibration damper includes some type of frictional elements, which are resiliently loaded against the part which is to be dampened. As the parts rotate, the damper portion will rotate with the rotating components. When a vibration occurs, the component will accelerate and the damper member is free to rotate relative to the component; however, the frictional contact therebetween will reduce the vibration and, in most instances, eliminate the vibration.

The vibration dampers that have been proposed in the past have a member that is spring-loaded in frictional engagement with the component that is to be dampened. A number of these dampers appear in railway car wheels and in steering mechanisms and take the form of snap rings or locking rings, as well as rotating masses disposed internal to the gearing element. The one element that the prior art dampers have in common is the fact that each has a spring-loaded or resiliently-loaded element, which imposes the friction force between the damper and the member to be dampened.

SUMMARY OF THE INVENTION

It is an object of the present invention to provide an improved vibration damper for a rotating element.

In one aspect of the present invention, a damping mass or element is disposed interiorly of a rotating element and is free from rotation therewith and free from enforced contact during nonrotation periods.

In another aspect of the present invention, the damping element consists of two components that are equal in size and shape.

In yet another aspect of the present invention, each of the components of the damping element has a wide semi-cylindrical portion and a narrow semi-cylindrical portion.

In still another aspect of the present invention, the wide semi-cylindrical portion of one member is axially aligned with the narrow semi-cylindrical portion of the other member.

DESCRIPTION OF AN EXEMPLARY EMBODIMENT

Figure 1:
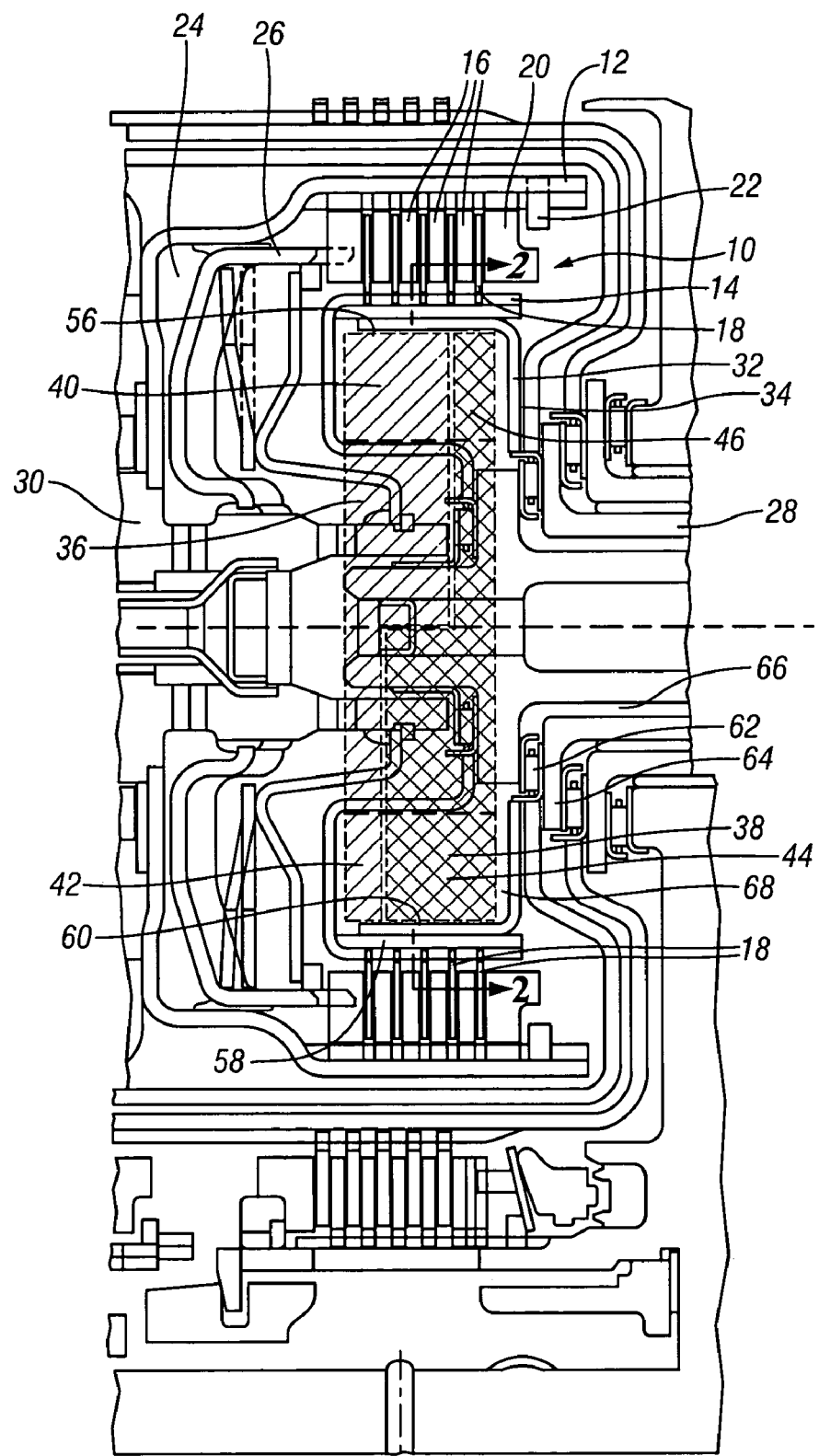
FIG. 1 is a partial elevational view of a transmission rotating component in which the present invention is incorporated.

Referring to the drawings, wherein like characters represent the same or corresponding parts throughout the several views, there is seen in FIG. 1 a transmission clutch, generally designate 10. The clutch 10 has an outer splined hub 12 and an inner splined hub 14. The splined hub 12 has drivingly connected therewith a plurality of splined friction plates 16 and the splined hub 14 has drivingly connected therewith a plurality of splined friction plates 18.

The hub 12 also has splined therein a backing plate 20, which is generally made of steel and is thicker or more massive than the friction plates 16 and 18. The friction plates 16 are restrained from axially moving out of the hub 12 by a conventional backing ring 22. The hub 12 has formed therein a piston chamber 24 in which is slidably disposed a fluid-actuated piston 26. The piston 26 when fluid activated will enforce engagement between the friction plates 16 and 18 and thereby provide a torque-transmitting relationship between the hubs 12 and 14.

The hub 14 is drivingly connected with a shaft 28 and is adapted to deliver power from the hub 12 to an output portion of the transmission, not shown. The hub 12 is driven by an input shaft 30, which receives power from an input portion of the transmission. As is well known, the transmission will have a plurality of gears generally downstream of the clutch 10, which when the clutch 10 is engaged will provide the gear ratio through the remainder of the transmission to provide for controlled operation thereof.

The hub 14 has secured thereto a hub 32. The hubs 14 and 32 cooperate to form an annular cavity 34. A pair of damping elements or members 36 and 38 is rotatably disposed within the cavity 34. The damping element 36 has a wide semi-cylindrical mass or inertia element portion 40 and a narrow semi-cylindrical mass or inertia element portion 42. The damping element 38 has a wide semi-cylindrical mass or inertia element portion 44 and a narrow semi-cylindrical mass or inertia element portion 46. The portion 46 is axially aligned with the portion 40, and the portion 38 is axially aligned with the portion 42.

Figure 2:
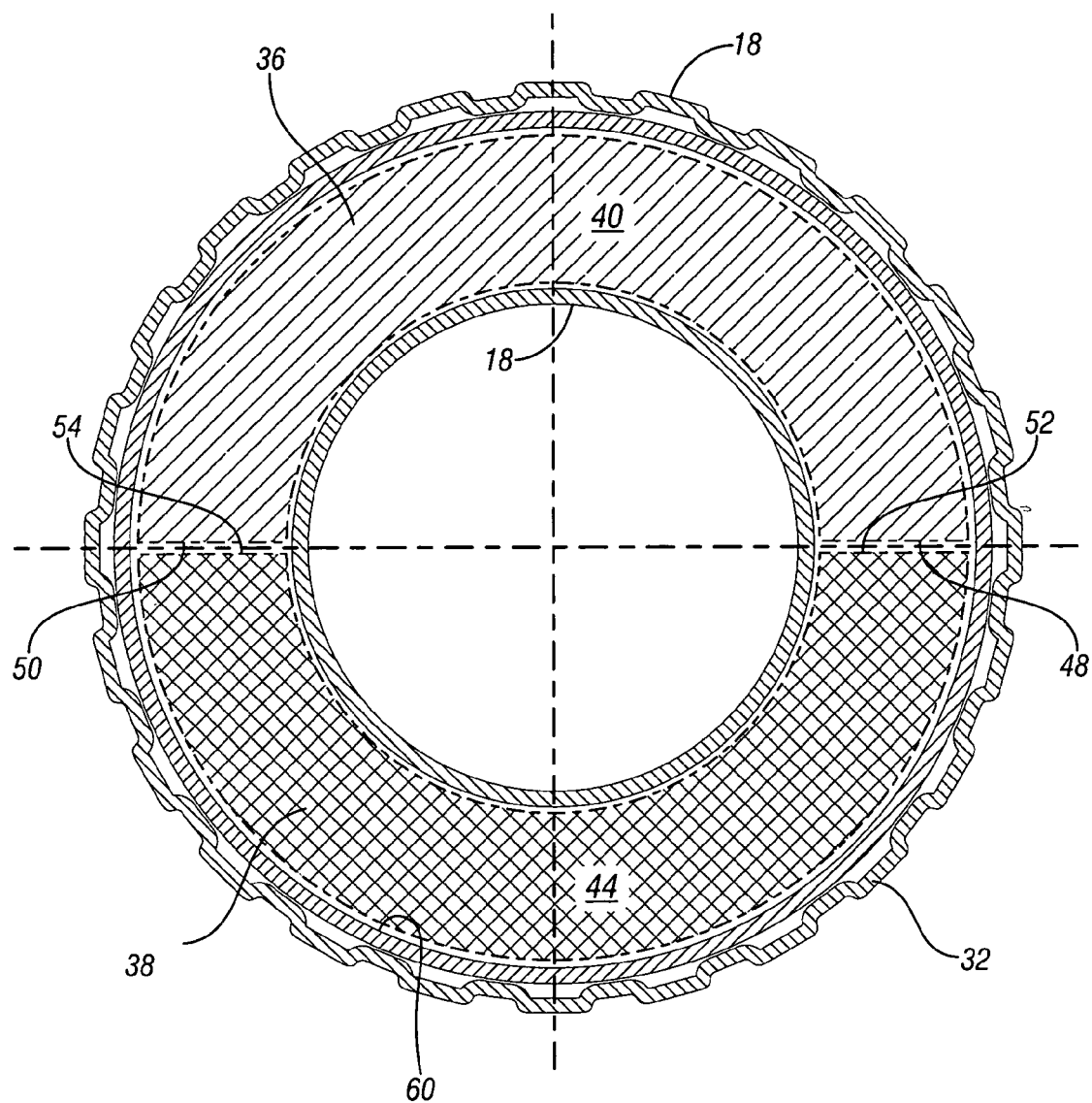
FIG. 2 is a view taken along line 2-2 of FIG. 1.

As best seen in FIG. 2, the portion 40 has a pair of flat radially projecting surfaces 48 and 50, which are in close contact with a pair of flat radially extending surfaces 52 and 54 formed on the semi-cylindrical portion 44. Therefore, the damping members 36 and 38 will not rotate to a significant amount relative to each other.

An outer periphery 56 of the damping element 36 and an outer periphery 58 of the damping element 38 are closely spaced from an inner periphery 60 of the hub 32. During rotation of the hub 14, the damping members 36 and 38 will be urged radially outward by the centrifugal forces imposed thereon and thereby come in contact with the inner periphery 60 of the hub 32. Provided there is no vibration energy present, the dampers 36 and 38 will rotate in unison with the hub 32. However, should a vibration energy be present, the hub 32 will try to accelerate and decelerate relative to the damper members 36 and 38. This rapid acceleration and deceleration will cause frictional energy to be transmitted between the damper elements 36 and 38 and the hub 32 as the damping elements 36 and 38 attempt to remain in rotational continuity with the hub 32.

The added inertia to the hub 32 will reduce the vibration energy and thereby reduce the vibration movement within the system. Since vibration energy generally has associated therewith noise, the noise related thereto will also be reduced if not eliminated completely. Each of the damper elements 36 and 38 will be urged radially outward to create normal forces between the elements 36 and 38 and the hub 32, resulting in a friction force therebetween. The amount or size of the normal forces will, of course, be determined partially by the mass of the elements 36 and 38 and in particular the drive of the semi-cylindrical mass portions 40 and 44. Thus, the amount of damping can be controlled by controlling the width of the semi-cylindrical mass portions 40 and 44, which, of course, results in a change of the cylindrical width of the portions 42 and 46, which combine with the portions 44 and 40 to fill the cavity 34 of the hub 32. This will permit tuning of the damper within the system.

The hub 32 and the shaft 28 connected therewith have a radial needle bearing assembly 62 disposed between the shaft 28 and a hub 64. The hub 64 and the shaft 28 have a lubrication passage 66 formed therebetween into which conventional lubrication fluid is pumped. The lubrication fluid within the passage 66 is also pumped outwardly by the bearing 62 and through a space 68 in the cavity 34. The fluid in the space 68 flows around the outer periphery of the elements 36 and 38 and is expelled outwardly through small radial passages formed in the hub 32 and also in the hub 14. The fluid which is forced through the system reduces the heat generation which will accompany the frictional forces between the dampers 36 and 38 and the hub 32.

The invention claimed is:

1. A vibration damper apparatus comprising:
   a rotatable hub;
   a first inertia member rotatably supported within said hub for relative rotation thereto including a first mass portion having a first thickness and a second mass portion having a second thickness, said first mass portion thickness having less thickness than said second mass portion; and
   a second inertia member rotatably supported within said hub for relative rotation thereto including a third mass portion having a thickness substantially equal to said first mass portion and having a fourth mass portion having a second thickness substantially equal to said second mass portion and being axially aligned with said first mass portion;
   wherein said first inertia member includes a pair of first flat radially projecting surfaces each extending from an inner periphery of said first inertia member to an outer periphery of said first inertia member; and
   wherein said second inertia member includes a pair of second flat radially projecting surfaces each extending from an inner periphery of said second inertia member to an outer periphery of said second inertia member, said pair of second flat radially projecting surfaces opposing the first pair of radially projecting surfaces for rotatably coupling the first inertia member to the second inertia member to prevent said first inertia member from rotating relative to said second inertia member.

2. The vibration damper apparatus defined in claim 1 further comprising:
   each of said inertia members having an outer periphery disposed adjacent an inner periphery of said hub means; and
   a means for introducing fluid into said hub for distribution to said outer peripheries of said inertia members.

3. The vibration damper apparatus of claim 2 wherein the pair of first flat radially projecting surfaces extends radially and axially.

4. The vibration damper apparatus of claim 3 wherein the pair of second flat radially projecting surfaces extends radially and axially.

5. The vibration damper apparatus of claim 4 wherein the first inertia member has an annular shape.

6. The vibration damper apparatus of claim 5 wherein the second inertia member has an annular shape.

7. The vibration damper apparatus of claim 6 wherein the first inertia member and the second inertia member are each asymmetrical about a central axis.

8. The vibration damper apparatus of claim 7 wherein rotation of the first inertia member forces an outer periphery of the second mass portion to contact the inner periphery of the hub.

9. The vibration damper apparatus of claim 8 wherein rotation of the second inertia member forces an outer periphery of the fourth mass portion to contact the inner periphery of the hub.

10. The vibration damper apparatus of claim 9 wherein the first and second inertia members are disposed in a cavity defined by the hub.

11. The vibration damper apparatus of claim 10 wherein the means for introducing the fluid into the hub is a fluid passage formed by an outer surface of the hub and a shaft about which the hub is rotatably supported.

* * * * *